United States Patent [19]

Ibison et al.

[11] Patent Number: 5,506,913
[45] Date of Patent: Apr. 9, 1996

[54] METHOD OF RECOGNIZING AN IRRADIATION FIELD

[75] Inventors: Michael Ibison, Bournemouth, United Kingdom; Pieter P. Vuylsteke, Mortsel, Belgium

[73] Assignee: Agfa-Gevaert N.V., Mortsel, Belgium

[21] Appl. No.: 83,350

[22] Filed: Jun. 28, 1993

[30] Foreign Application Priority Data

Feb. 11, 1993 [EP] European Pat. Off. ............... 93200376

[51] Int. Cl.⁶ .................................................. G06K 9/48
[52] U.S. Cl. ........................................ 382/132; 382/199
[58] Field of Search .................................. 382/22, 6, 199, 382/128, 131, 132; 364/413.13; 250/587

[56] References Cited

U.S. PATENT DOCUMENTS

| | | | |
|---|---|---|---|
| 4,804,842 | 2/1989 | Nakajima | 250/327.2 |
| 4,952,805 | 8/1990 | Tanaka | 250/327.2 |
| 4,952,807 | 8/1990 | Adachi | 250/327.2 |
| 4,970,393 | 11/1990 | Funahashi | 250/327.2 |
| 4,992,663 | 2/1991 | Takeo | 250/327.2 |
| 5,170,440 | 12/1992 | Cox | 382/22 |

Primary Examiner—Joseph Mancuso
Attorney, Agent, or Firm—Richard J. Birch

[57] ABSTRACT

Radiologists may protect their subjects against unnecessary exposure to X-rays by use of X-ray opaque material. The resulting image contains relatively unexposed regions which comprise the shadow cast by the X-ray opaque material. This invention discloses a method for the automatic determination of the location of the boundary between signal and shadow regions. Many hypotheses as to the location of the boundary are generated and the final decision as to the correct hypothesis is contingent on the results of a number of high-level tests applied to each.

7 Claims, 12 Drawing Sheets

METHOD OF RECOGNIZING AN IRRADIATION FIELD

FIELD OF THE INVENTION

The present invention is in the field of digital radiography. The invention more specifically relates to a method of recognising an irradiation field in a system wherein a radiation image is recorded on a photostimulable phosphor screen by means of an irradiation field stop (i.e. means for partially shielding against irradiation).

DESCRIPTION OF PRIOR ART

Radiologists may protect their subjects against unnecessary exposure to X-rays by use of X-ray opaque ('collimation') material. The material is placed in the path of the X-ray beam so as to shield those areas of the patient which are not regarded as diagnostically important. Besides reducing patient dose this technique has the additional advantage of limiting the amount of scattered radiation in the image field of interest. The regions of the resulting image which comprise the shadow cast by the X-ray opaque material (shadow regions, cfr. example in FIG. 1) are exposed only by scattered radiation.

In computer-assisted radiology, the X-ray image is digitised as a two dimensional array of numbers, whose magnitude is related to the intensity of X-rays arriving at the detector, via the patient. The values in the array may be rescaled, prior to display or printing, in order to maximise the visual contrast in the area of diagnostic interest. Such rescaling depends, in part, on the intensity histogram of the X-ray image. To achieve this function automatically, best results are obtained if the 'shadow' cast by the collimation material is excluded from consideration, since it cannot contain any useful information, but would otherwise dominate the lower end of the intensity histogram.

The presence of the collimation shadow region can cause an additional problem in the display of the image on film. Therein, the shadow region is relatively bright, and if displayed unmodified, may impair diagnosis of subtle lesions due to dazzle, especially if the unexposed region is relatively large.

The U.S. Pat. No. 4,952,807 by Adachi addresses the first problem, wherein a method is disclosed for adjusting the image processing conditions by selecting only those pixels which correspond to the object or to the background, i.e. the 'signal' region, under the assumption that the collimation material does not partly cover the object, i.e. the shadow region does not touch the object of the image, but rather its surrounding background. In many kinds of examinations however, parts of the patient will be shielded from exposure to avoid useless X-ray load, as is the case with lumbar spine and shoulder examinations.

The U.S. Pat. No. 4,804,842 from Nakajima also addresses the first problem, wherein a method is disclosed for removing the lower part of the histogram corresponding to the pixels in the shadow region in order to adjust the image processing conditions.

However, techniques for histogram modification alone, do not address the second problem, i.e. that of dazzle. Its solution demands an explicit detection of the shadow region, as distinct from the signal region. The offending shadow region may then be excluded from the display process. In addition, the first problem of rescaling for optimum visual contrast can then proceed on the signal region alone, without the complicating influence of the shadow region on the intensity histogram.

Previous work in the field of automatically delineating the signal/shadow regions has relied on piecemeal attempts at the solution.

Many of the proposed methods are based on collecting candidate signal/shadow border pixels (i.e. edge pixels at the interface between signal and shadow regions) by thresholding on first differences along predetermined lines that might cross the signal/shadow border. A typical example of this approach is proposed by Funahashi in the U.S. Pat. No. 4,970,393. The signal region is recognized as a region enclosed by pixels where the first difference exceeds some specified threshold, either positive or negative.

A refinement of this technique is proposed by Takeo in the European patent 0 342 379, where multiple candidate pixels along a searching line are ranked, and only the highest rank candidates on each searching line are considered in assembling the signal/shadow boundary. In both methods the underlying assumption is that the signal/shadow boundary has strong contrast everywhere. In many cases however, contrast along parts of the signal/shadow boundary is nearly zero, especially if the collimation material is partially covering very dense parts of the body. So if the recognized signal/shadow boundary is assembled from high difference pixels many gaps will occur in general.

In the European patent 0 285 174 by Funahashi a straightforward application of the basic Hough transform technique is proposed to delineate the signal/shadow boundary, which is assumed to be polygonal. The Hough transform is applied to prospective edge points obtained by differentiation. The underlying assumptions are that the signal/shadow boundary is piecewise linear, and has high contrast with respect to the contrast of line features within the signal region. However, experimental evidence shows that edges within the signal region, e.g. bone edges, frequently have higher contrast than the signal/shadow boundary. As a consequence points in Hough transform space that correspond to straight bone boundaries may have higher scores than some of the actual signal/shadow borders, in which case the subsequent delineation procedure will fail.

A different approach is disclosed in the European patent 0 360 231 by Funahashi. The image is subdivided into mutually adjacent non-overlapping tiles. A statistical parameter is computed indicating the edge content of the tile, either by differentiation in image space, or in frequency space. The tiles are accordingly classified as belonging to the relevant image region or not.

We ran elaborate experiments and concluded that single criteria based on edge contrast, or local statistical parameters at both sides of a prospective signal/shadow boundary, such as mean value, min, max, variance or spatial frequency coefficients are inadequate in delineating the irradiated field with a high level of confidence, say >98 percent. We found that the signal/shadow border contrast will vanish in some cases; anatomical structures may be straight and have high contrast edges; the image signal (which represents local dose) in the shadow region will occasionaly be higher than the signal in the unshielded (i.e. diagnostic) image region—in cases where the scattered radiation is high and some parts of the body are difficult to penetrate by radiation. Also we found that there is no essential distinction between image areas corresponding to very poorly penetrated bone, and areas corresponding to shielded parts. Both kinds of areas will be characterised by an extremely low mean value (i.e. dose), similar noise level (both quantum limited), and by the absence of other features (since the signal to noise ratio is very low).

In order to obtain a high success rate, a preferred method should consider many hypotheses as to the location of the signal/shadow boundary, and keep or reject each prospective signal-shadow boundary "as a whole", instead of keeping or rejecting individual components of a hypothesis, such as edges.

Multiple hypotheses as to the location of the signal/shadow boundary are considered in the method disclosed by Tanaka in the U.S. Pat. No. 4,952,805. For each of the corresponding candidate signal regions, two signal histograms are computed: one for the pixels inside the candidate irradiation field and one for the pixels outside. The candidate boundary which is characterised by the largest degree of interclass separation as determined from both histograms is selected to be the recognised irradiation field. The degree of interclass separation is defined in such a way that a high value will result if there is very little overlap between both histograms. Hence this criterion will be effective only if the range of signal values within irradiation field are well separated from the signal values in the shielded region, which does not hold in many practical cases as we verified on the basis of digital radiographs from various examinations.

Also, there is a practical limitation regarding the usability of the above mentioned approach, in that the number of hypotheses as to the location of the irradiation field may be prohibitively large.

Previous work in general has focussed on methods in which finding the boundary of an irradiation field essentially relies on a very small number of mostly local criteria. Reviewing a wide variety of examinations confirms that individual criteria will only work in a very limited number of cases. A high success rate can only be achieved if many sources of evidence are combined, ranging from local image features to global constraints.

The behaviour of the radiologist, in placing the collimation material around the patient, may broadly be characterised by a set of simple rules. This invention addresses only the use of collimation material which casts a shadow whose outline is piece-wise linear. More specifically, the boundary between signal, and shadow regions is assumed to be a rectangle of arbitrary location and orientation. It is assumed that the signal region is on the interior, and that any part of the rectangular boundary may, or may not, have a projection onto the (rectangular) detector, and therefore the image array; see FIG. 1.

OBJECTS OF THE INVENTION

It is an object of the present invention to provide a method of recognising an irradiation field in a system wherein a radiation image has been recorded by using an irradiation field stop (collimation material).

It is a further object to provide a method for determination of the location of the signal/shadow boundary of an X-ray image, wherein the x-ray image is represented by a digital signal representation and wherein a signal/shadow boundary is the locus of interface between the signal and the shadow regions resulting from the obscuring by the collimation material.

It is a still further object to provide such a method in a system wherein a radiation image is recorded in a photostimulable phosphor screen and wherein said radiation image is read by scanning the screen with stimulating radiation and by detecting the light emitted upon stimulation.

It is still a further object of the present invention to aid the process of contrast-enhancement of an X-ray image, by permitting such to perform its calculations based solely on the diagnostically useful signal part of the X-ray image, and to reduce the brightness in shadow region to avoid dazzle during diagnosis.

STATEMENT OF THE INVENTION

The present invention provides a method for the determination of the location of the signal/shadow boundary in an X-ray image represented in a digital signal representation comprising the steps of:

i) Extracting low-level primitives from the X-ray image $\{X(i,j)\}$, ii) Forming a reduced number of intermediate-level primitives from the low-level primitives, iii) Building hypotheses as to the location of the signal-shadow boundary from combinations of intermediate-level primitives, during which each combination is subject to intermediate-level tests, whereupon partial or complete hypotheses are rejected or accepted, iv) Performing high-level verification tests on each prospective signal-shadow boundary whereupon hypotheses are rejected, or accepted at some cost, v) Selecting the prospective signal-shadow boundary with the least cost.

The method of the present invention is a major departure from earlier methods in that, in general, it generates many hypotheses as to the location of the boundary. The final decision as to the correct prospective signal-shadow boundary is contingent on the results of a number of high-level tests applied to each.

The method permits codification of expert-system type knowledge as to the geometry, topology, and statistics of the signal/shadow boundary, and associated regions.

The invention is, for example, applicable to a digital image signal obtained by exposing a photostimulable phosphor screen to an image originating from a partially shielded exposure of an object to X-rays, by scanning the screen with stimulating irradiation, detecting the light emitted upon stimulation and converting the detected light into a digital signal representation.

Commonly the digital signal is subjected to image processing such as contrast enhancement and signal-to-density mapping before being applied to an output device for reproduction or display. The result of the process of contrast-enhancement of an X-ray image is enhanced by permitting such to perform its calculations based solely on the diagnostically useful signal part of the X-ray image, and to reduce the brightness in shadow region to avoid dazzle during diagnosis.

In the statement of the invention and in the description hereinafter the term "X-ray image" is used in the meaning of a two-dimensional digital image repesentation as an array of numbers, the magnitudes of which are directly related to the intensity of the X-rays arriving at a 2-dimensional physical detector such as a photo-stimulable phosphor screen.

By "primitives" is meant features, such as edges, which are extracted from the image as the result of low-level image processing, cfr. FIG. 2.

An "intermediate-level primitive" is a combination of (basic) primitives which may be considered collectively when building a prospective signal-shadow boundary. Intermediate-level primitives are generally fewer, and (spatially) larger than are (basic) primitives. Each primitive is constructed from a mutually exclusive set of pixels. Each intermediate-level primitive is constructed from a mutually exclusive set of (basic) primitives.

By the term "signal region" is meant the spatial area of an image which is not obscured by collimation material from a direct line-of-sight of the X-ray source, see FIG. 1b.

The "shadow region" is the area of the image which is obscured by the collimation material from a direct line-of-sight of the X-ray source; see also FIG. 1b.

The "signal-shadow boundary" is the locus of the interface between the signal and the shadow regions. E.g. the pixels at the interface between the signal and the shadow regions.

A low-level primitive can be a line—being a data structure to represent an edge, and associated data, including its parameterisation—or a tile—being a small rectangular area of pixel resulting from a tessellation of the image array.

Steps i) and ii) of the method of the invention achieve a reduced set of primitives which can be assembled into hypotheses as to the location of the signal-region.

A prospective signal-shadow boundary is defined as a possible solution posited by the method of the present invention, said solution being a segmentation (division into similar regions) of the original image into signal and shadow regions, e.g. a two-dimensional array of numbers isomorphic with the X-ray image, with pixel labels for signal and shadow regions.

Hypotheses are generated from the reduced (intermediate-level) set because, in general, the number of low-level primitives is too numerous to perform an exhaustive evaluation (step iv) of every possible combination (step iii).

Specifically, if the low-level primitives are lines, then the intermediate-level primitives would be line-clusters, the result, for instance, of a linear agglomerative clustering process.

A line cluster is then one or more lines which are deemed to be in some manner similar, and have been accordingly grouped together.

E.g. one or more lines which have been grouped together by a linear agglomerative clustering process. In the example of FIG. 3, the lines 1b and 1c may be clustered together to form a line cluster {1b, 1c}. Similarly, in the same example, the likely clusters are {1a}, {1d}, {1e, 1f, 1g}.

Alternatively, a low-level primitive can be a tile, i.e. a small rectangular array of pixels resulting from a tessellation of the image array. In this case an intermediate-level primitive would be a tile-cluster, being a group of spatially connected tiles having in common a feature or an attribute.

Step iii) combines the intermediate-level primitives into complete hypotheses posited by the system.

The definition of the term prospective signal-shadow boundary was given hereinbefore, by which term is meant a possible solution regarding the shape and position of signal and shadow-regions.

Such a solution is a segmentation or division of the image into signal and shadow regions.

One of the possible representations of such a segmentation is a two dimensional array of numbers, isomorphic with the X-ray image, the values of which represent a unique label which identifies the corresponding region in the X-ray image as either signal or shadow region.

A label generally is a pixel-value which associates the pixel, i.e. the location in the image array, with a particular class (having a particular quality or attribute).

In order to limit the number of hypotheses to be submitted for evaluation (step iv), the method includes provision for tests which may be applied during the construction of the prospective signal-shadow boundary, which serve to detect and reject, at an early stage, an incorrect prospective signal-shadow boundary.

Specifically, if the intermediate-level primitives are line-clusters for instance, then a possible test is on the mutual orthogonality of the line-clusters as putative sides of the signal/shadow border. Thus combinations of line-clusters which are not going to form a rectangle can be rejected at an early stage.

Step iv) permits the evaluation of hypotheses successfully assembled from the intermediate-level primitives. A major feature of this invention is the generation of multiple hypotheses, where in each prospective signal-shadow boundary is a candidate for the complete signal/shadow boundary.

The high-level tests permit evaluation of each prospective signal-shadow boundary, specifically of those attributes which can only be determined once a complete signal/shadow boundary is prospective signal-shadow boundaryed. By such high-level tests, hypotheses at this level may be ranked (or possibly rejected) in order that a single candidate may eventually be chosen.

Specifically, the ranking of hypotheses may be based on a scalar quantity representative of either the net positive or negative evidence in favour of, or against that prospective signal-shadow boundary. The distinction is immaterial: the highest ranking prospective signal-shadow boundary is that most like the idealised model. In the former case this will have the largest (positive score), in the latter: the smallest negative score.

The evidence may be based on any of a number or combination of primitives, and less local features of the original X-ray image. For instance, negative evidence may be accumulated against a candidate signal/shadow boundary for each corner of the signal/shadow boundary according to (a monotonic function of) the magnitude of the difference of the angle at the corner from 90 degrees. Such a test would attempt to enforce the rectangular geometry of the model. Broadly, tests may seek to enforce the geometry, topology, region statistics, and edge statistics required by the model.

Within these categories, other possible sources of evidence may involve tests for:

Edge statistics:

Linearity: The straightness for each of the candidate signal/shadow boundary sides (however they were achieved).

Existence: The accumulated evidence along the length of each side, computed from an edge-image, such as that furnished by Canny edge-detection for instance.

Continuity: The length of each candidate signal/shadow boundary side for which there exists no evidence from the edge-detection process.

Explanation: The ratio of used evidence to the total evidence. In this context, the evidence is the number of edge-pixels. The used evidence is the number of edge pixels in the signal/shadow boundary. The unused evidence is the number of edge pixels which lie on edges outside of, but colinear with, those edges deemded to be in the candidate signal/shadow boundary.

Geometry:

Proportion: The aspect ratio of the rectangle (perhaps favouring rectangles with an aspect ratio similar to that of the X-ray image).

Area: The area of the candidate signal-region (perhaps penalising very small rectangles).

Position: The placement of the centre of the candidate rectangle (perhaps favouring rectangles with their centre near the centre of the X-ray image).

Orientation: The orientation of the candidate rectangle within the image (perhaps favouring rectangles parallel with the edge of the X-ray image).

Region statistics:

Exposure: The mean, maximum, minimum (and the like) statistical measures derived from the (candidate) signal and shadow regions of the X-ray image (perhaps favouring low-exposure grey-levels in the shadow, versus signal regions).

Homogeneity: The variance (and the like) statistics derived from the (candidate) signal and shadow regions of the X-ray image (perhaps favouring low-variance grey-levels in the shadow, versus signal regions).

Topology:

Visibility: The visibility of the candidate signal/shadow boundary, i.e. the degree to which the candidate signal/shadow boundary is wholly contained within the image (perhaps favouring complete, rather than clipped boundaries—eg as in FIG. 1d rather than FIG. 1e).

Completeness: The number of visible rectangle sides. Hypotheses consisting of just two 'sides' (which are approximately orthogonal or parallel), can be considered as partially visible rectangles. The scoring may, for instance, favour hypotheses with more, over fewer, sides.

The scalar result of each test may provide for the rejection of a prospective signal-shadow boundary by assuming an appropriately small positive or large negative value, effectively denying that prospective signal-shadow boundary any chance of highest ranking.

Step v) is just the selection of that prospective signal-shadow boundary which is ranked the highest of those surviving the high-level tests of step iv).

The method of the present invention can be applied for recognising an irradiation field in cases where at the exposure step an irradiation field stop has been used.

It will be clear that the invention is not limited to this particular application. It can for example also be used when the borders of irradiation fields have to be determined in an application wherein at least two images are recorded in a juxtaposed relation, a mode often referred to as 'split screen'.

BRIEF DESCRIPTION OF DRAWINGS

The method of the present invention as well as particular embodiments hereof will be explained hereinafter with reference to the accompanying drawings wherein FIG. 1 shows examples of location, orientation, and visibility of signal/shadow boundary.

FIG. 5 are examples of vertex classifications for the central pixel in each 3×3 array.

The following is a detailed description of each of the individual method steps of the present invention.

Step i) Extraction of low-level primitives

The preferred low-level primitives are lines. They are derived from the X-ray image in two stages: edge-detection and segmentation.

1.1 Edge Detection

Figure 9A:
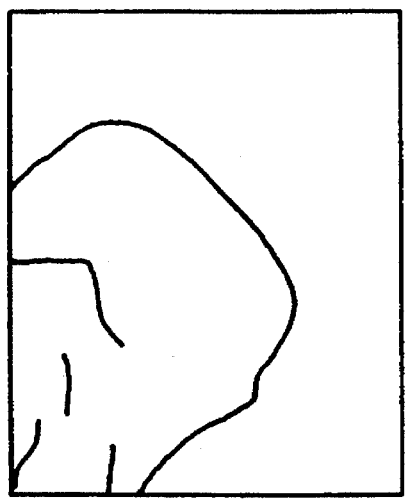
FIG. 9a shows an edge image.

The purpose of this stage is to produce an edge-image: see for example FIG. 9a. Our system incorporates a Canny edge-detection process.

The following are definitions of some terms used in connection with a Canny edge detection process:

Canny edge-detection: A particular process for edge-detection comprising optional smoothing, followed by production of an edge-image wherein a pixel is labelled as an edge-pixel if and only if the Sobel squared magnitude at that point is a local maximum along the (one-dimensional) trajectory which is normal to the Sobel orientation.

A Canny edge-image $\{E(r)\}$ is formed by non-maximal suppression of the Sobel squared magnitude in the direction of the orientation of the image gradient, i.e. normal to the Sobel orientation:

$$E(\underline{r}) = 1 \text{ if } G(\underline{r}) > G(\underline{r} + \underline{R}_q) \geq G(\underline{r} - \underline{R}_q)$$
$$= 0 \text{ otherwise}$$

where $$\underline{R}_q = (1,0) \text{ if } ||Q(\underline{r})| - \pi/2| \leq \pi/8$$
$$= (1,-1) \text{ if } ||Q(\underline{r}) + \pi/4| - \pi/2| < \pi/8$$
$$= (1,1) \text{ if } |Q(\underline{r}) + \pi/4| < \pi/8$$
$$= (0,1) \text{ if } |Q(\underline{r})| \leq \pi/8$$

Figure 1A:
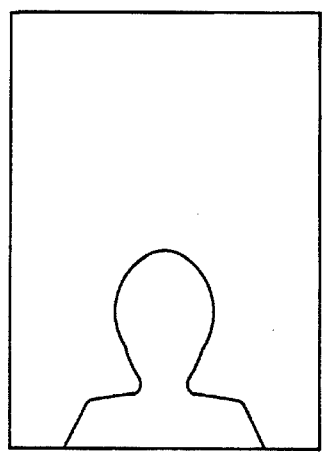
FIG. 1a shows an image with no collimation shadow regions.
Figure 1B:
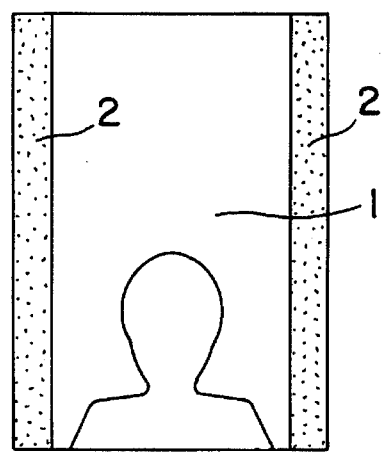
FIG. 1b shows an image wherein two sides of the rectangle are visible, (1) is the signal region, (2) are the shadow regions.
Figure 1C:
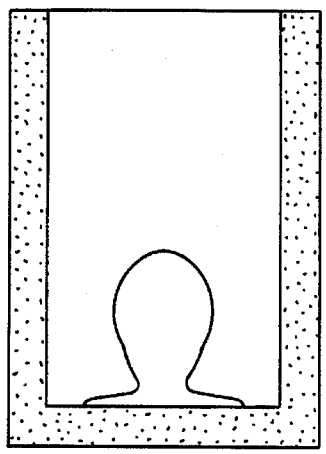
FIG. 1c shows an image with 3 sides of the rectangle visible.
Figure 1D:
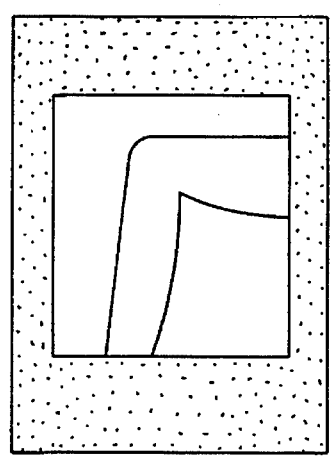
FIG. 1d shows an image with all 4 sides of the rectangle visible.
Figure 1E:
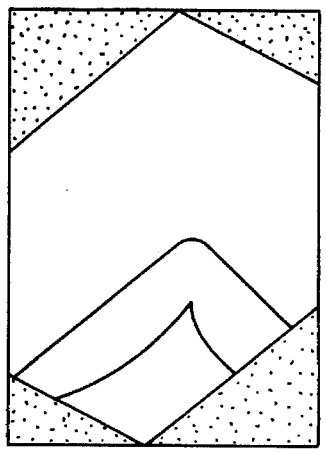
FIG. 1e shows an image wherein 4 sides are partially visible.
Figure 1F:
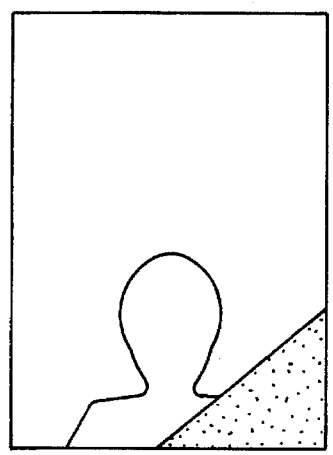
FIG. 1f shows an image with 1 side visible.
Figure 2A:
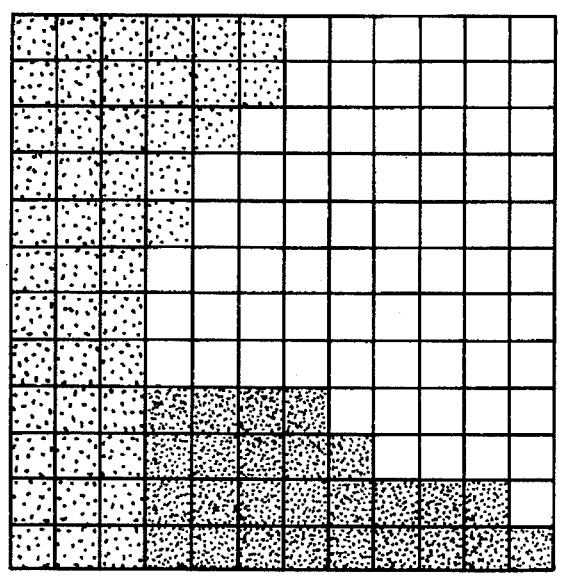
FIG. 2a shows the original image.
Figure 2B:
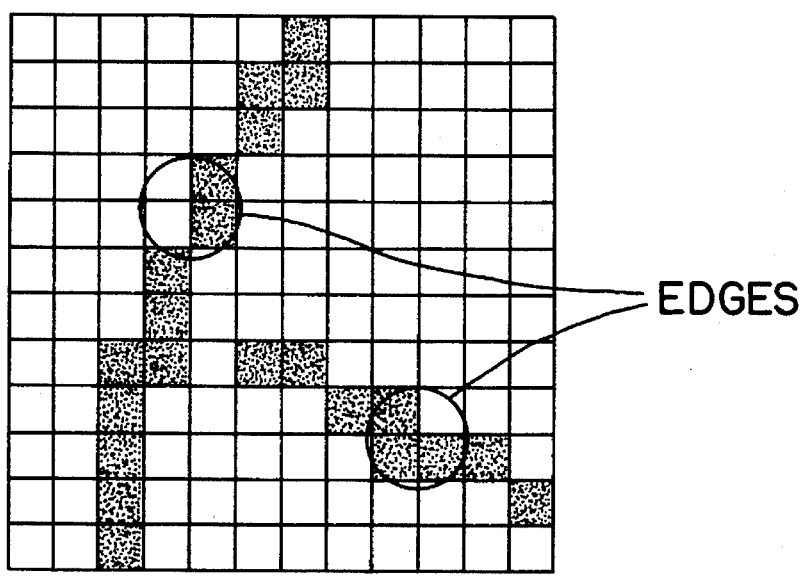
FIG. 2b shows the edge image.
Figure 3:
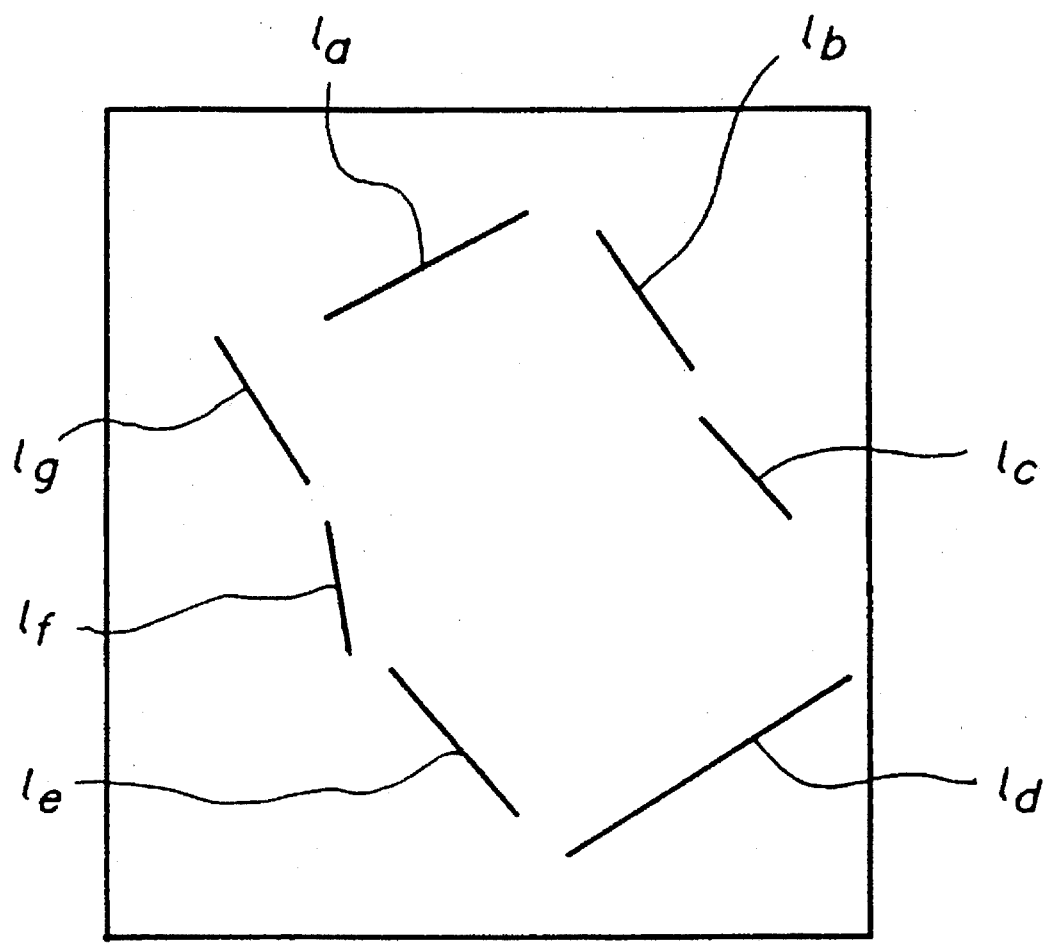
FIG. 3 is an example for line clustering. Lines $1_b$ and $1_c$ may be clustered. Similarly, lines $1_e$, $1_f$, and $1_g$ may be clustered.

Let a mean a is bold and vectors r, $R_q$ represent the two-dimensional coordinates on the image plane (r=(i,j) say). For an illustration, see FIG. 2.

Smoothed image: An intrinsic image derived from the X-ray image wherein the high spatial frequencies are suppressed relative to the low spatial frequencies. E.g. the result of convolution of the X-ray image with a (two-dimensional) Gaussian.

Sobel squared magnitude: The pixel-value $G(i,j)$ representing the square of the gradient-magnitude of the image $\{X(i,j)\}$ as determined by the following formula:

$$G(i,j)=(X(i+1,j)-X(i-1,j))^2+(X(i,j+1)-X(i,j-1))^2$$

Sobel orientation: The pixel-value $Q(i,j)$ representing the orientation of the tangent to the iso-gradient-magnitude of the image $\{X(i,j)\}$, as determined by the following formula:

$$Q(i,j)=atan2(X(i+1,j)-X(i-1,j), X(i,j+1)-X(i,j-1))$$

where atan2 (y,x) is the arctangent C language function defined in $[-\pi, \pi]$.

The edge-detection process incorporated in our system comprises four stages:

1.1.1 Subsampling of the X-ray image

Figure 12:
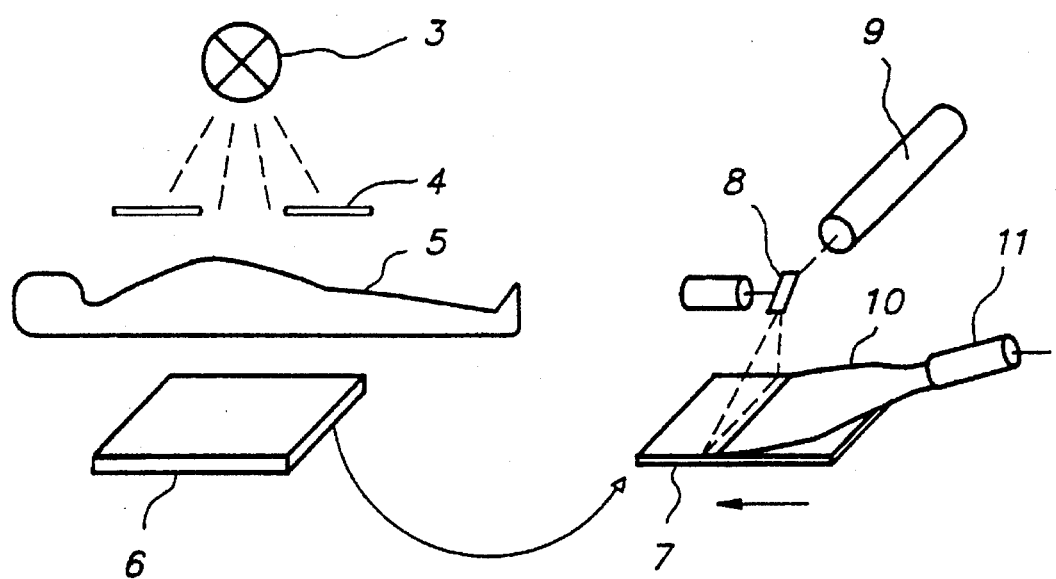
FIG. 12 is an exposure and read-out apparatus.

The subsampling reduces the number of pixels of an image. For example: an original image obtained by reading an irradiation image stored in a photostimulable phosphor screen (cfr. FIG. 12) comprising approximately 5 million pixels, is reduced to an image of about 20000 12-bit pixels, preserving the aspect ratio of the original image.

1.1.2 Canny Edge-Detection

The subsampled image is passed to a Canny edge-detector to produce images: Sobel-squared magnitude $\{G(i,j)\}$, Sobel-orientation $\{Q(i,j)\}$, and edge-image $\{E(i,j)\}$. The Gaussian smoothing is via a symmetric 5×5 convolution mask with weights calculated to effect a standard deviation of 0.35 pixels.

1.1.3 Elimination of Weak Edges

Edge-points with a low gradient magnitude indicate a weak edge. Studies have shown that the signal/shadow boundary is generally of high contrast, giving a large gradient magnitude. Very weak edges are therefore unlikely to form part of the signal/shadow boundary. Those with a Sobel-squared-magnitude below a threshold of 2000 are removed from $\{E(i,j)\}$, and correspondingly from $\{Q(i,j)\}$, and $\{G(i,j)\}$.

1.1.4 Angle of Locus

The orientation $\{O(i,j)\}$, of the locus of edge-points in the edge-image $\{E(i,j)\}$, is calculated in three stages: edge-thinning, connectivity analysis, linear regression.

1.1.4.1 Thinning

The edge-image is destructively thinned. The motivation is threefold:

1. The parameters of a regressed straight line, including the goodness-of-fit, are more accurately determined from the spatial distribution of edge-points.
2. The various types of junction (TERMINAL, T-JUNCTION, . . . ) are more easily detected. This is required for corner-detection (below).
3. There then exists a close correspondence between the length of a straight line, and the number of (connected) edge-pixels of which it is made up. This is required for line-statistics (above).

Figure 4B:
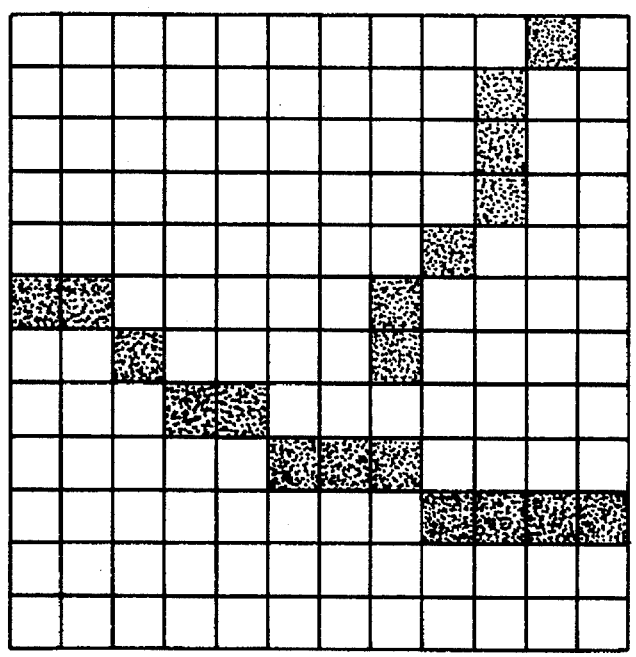
FIGS. 4a–b are an example of edge thinning.
Figure 4A:
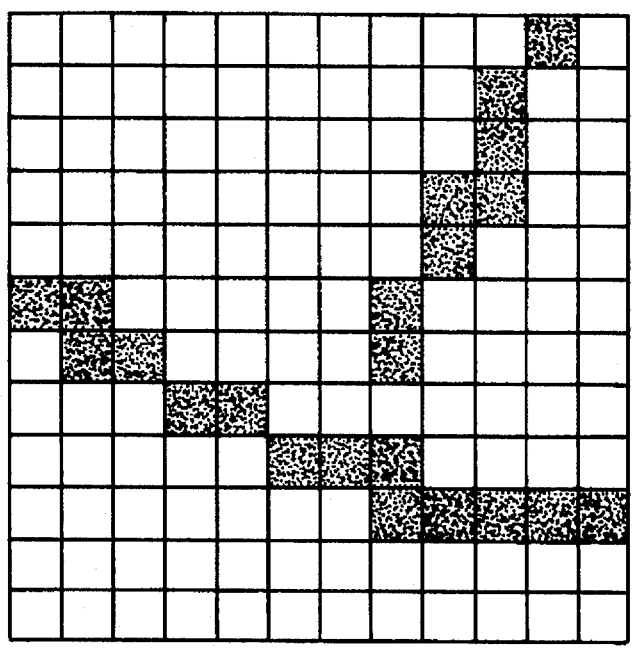
Figure 5E:
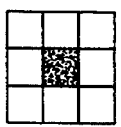
FIG. 5e: X-junction.
Figure 5D:
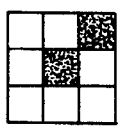
FIG. 5d: T-junction.
Figure 5C:
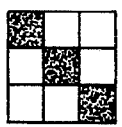
FIG. 5c: edge-point.
Figure 5B:
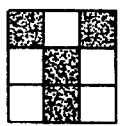
FIG. 5b: terminal.
Figure 5A:
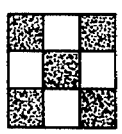
FIG. 5a: isolated point

Thinning is achieved by removing edge-pixels which do not affect the local (3×3) connectivity of other edge-pixels. See FIG. 4 for an example.

1.1.4.2 Connectivity Analysis

Connected edges are uniquely labelled by recursive edge-walking to create a label image $\{L(i,j)\}$. All edge-pixels mutually connected share a common, but otherwise unique, label.

1.1.4.3 Linear regression

In this connection the following definitions are first given:

Linear regression: The process by which an edge can be optimally parameterised according to the spatial location of its constituent edge-pixels. E.g. the determination of the parameters of a line which are the radius to the normal (from the origin), and its orientation relative to the X-axis, by a least squares (of perpendicular distances) fit.

Weighted linear regression: The process by which an edge can be optimally parameterised according to both the spatial location of its constituent edge-pixels, and the degree of certainty as to their correct classification (labelling). E.g. the determination of the parameters of a line which are the radius $R_{WLR}$ to the normal (from the origin), and its orientation $Q_{WLR}$ relative to the x-axis, by the minimisation of a weighted least squares (of perpendicular distances) fit, the weighting being the Sobel squared magnitude.

Let $P_k$ be the positions of the edge-pixels (indexed by k) which comprise the line:

$$p_k=(p_k^{(x)}, p_k^{(y)})$$

and let the positional covariance matrix be $\Gamma$:

$$\Gamma = \begin{bmatrix} \Gamma^{(x,x)}, & \Gamma^{(x,y)} \\ \Gamma^{(y,x)}, & \Gamma^{(y,y)} \end{bmatrix}$$

given by $$\Gamma^{(a,b)}=\Sigma_k p_k^{(a)} p_k^{(b)} w_k - \Sigma_k p_k^{(a)} w_k \Sigma_k p_k^{(b)} w_k$$

for a,b in $\{x,y\}$
then $$Q_{WLR}=\tfrac{1}{2} atan2(-2\Gamma^{(x,y)}, \Gamma^{(x,x)}-\Gamma^{(y,y)})$$

and $$R_{WLR}=(\sin(Q_{WLR})\Sigma_k p_k^{(x)} w_k + \cos(Q_{WLR}) \Sigma_k p_k^{(y)} w_k)/\Sigma_k w_k$$

The eigenvalues $\lambda_+, \lambda_-$ of $\Gamma$ are the sum of square errors (i.e. proportional to the variances) in each of the principal directions ie along, and normal to, the best fit straight line:

$$2\lambda_\pm=Tr(\Gamma)\pm(Tr(\Gamma)^2-4Det(\Gamma))^{1/2}$$

In the described embodiment of the present invention the orientation of the locus at each point is calculated by linear regression of connected edge-points in a local neighbourhood (nominally 7×7). The connectivity is guaranteed by including only those pixels which, in $\{L(i,j)\}$, share a common label. The positional-covariance matrix gives the orientation of the maximum variance of the data which is also the orientation of the least-squares fit straight line with two degrees of freedom.

With reference to the definition of weighted linear regression, with $w_k=1$: $O(i,j)=Q_{WLR}$ is the orientation of the locus of edge-points without regard to the sense of the original edge. The ambiguity in the sense of the locus is resolved by borrowing from the Sobel orientation Q(r): the direction of the tangent to the Sobel squared magnitude iso-contour is always close to the direction of the tangent to the locus of edge-points as determined by the Canny edge-detector.

Therefore the orientation is adjusted to minimise the angular separation between $O(i,j)$ and $Q(i,j)$:

$$\text{Min } \{O(i,j)-Q(i,j)+k\pi\}=>k_{min} k \text{ in } \{-3..3\}$$

$$O(i,j) := O(i,j) - Q(i,j) + k_{min}\pi + 2n\pi$$

where n is chosen so that the result is in $[0, 2\pi]$.

1.2 Segmentation

Figure 9B:
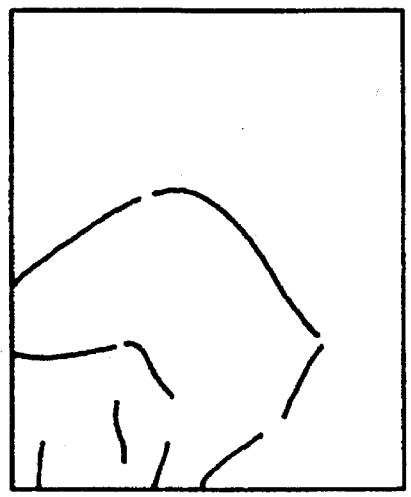
FIG. 9b shows vertex image edge-points.

Line primitives are built from the remaining edges. The chains of edge-pixels are broken into piece-wise straight sections (FIG. 9b), and the pixels from each section assembled into a line structure.

There are four steps to this procedure:

1.2.1 Vertex Analysis

An intrinsic image $\{V(i,j)\}$ is constructed with labels for the classification of edge-pixels in $\{E(i,j)\}$. According to the 3×3 connectivity of edge-pixels in $\{E(i,j)\}$, one of the following labels are awarded to the corresponding point in $\{V(i,j)\}$: ISOLATED-POINT, TERMINAL, EDGE-POINT, T-JUNCTION, X-JUNCTION. An example of each is given in FIG. 5.

1.2.2 Corner Detection

Corners are detected by a refinement of the EDGE-POINT labels in $\{V(i,j)\}$. There are two stages:

1.2.2.1 Curve detection

An intrinsic image $\{U(i,j)\}$ is calculated with values assigned to each pixel which corresponds to an EDGE-POINT labelling in $\{V(i,j)\}$. The pixel values in $\{U(i,j)\}$ measure the local conformity of edge-pixels in $\{E(i,j)\}$, in a 7×7 neighbourhood, to a straight-line. The positional covariance matrix is calculated as described in 1.1.4.3 with all $w_k = 1$.

The conformity, (to a straight line) is taken to be the ratio of major to minor eigenvalues of the positional covariance matrix, ie $\lambda_{30}\lambda_-$. Pixels previously labelled as EDGE-POINTs in $\{V(i,j)\}$ are then relabelled as CURVEs, if the conformity is less than a threshold value:

If $V(i,j) =$ EDGE-POINT, and $\lambda_+/\lambda_- > 0.04$, then $V(i,j) =$ CURVE.

1.2.2.2 Non-maximal supression

The pixels in $\{U(i,j)\}$ are identified as corners if they are both CURVE points in $\{V(i,j)\}$ (i.e. having a value above some threshold), and they are locally maximum in a 3×3 neighbourhood. The corresponding pixels in $\{V(i,j)\}$ are relabelled as CORNERS.

1.2.2 Extraction of connected edges

Those pixels in $\{V(i,j)\}$ still retaining an EDGE-POINT classification are candidates for incorporation into the low-level primitives. Such pixels are extracted from $\{V(i,j)\}$, into $\{S(i,j)\}$ say, which is the linear segmentation as an intrinsic image: each connected chain of pixels is given a unique label in $\{S(i,j)\}$. Each connected set of pixels is then gathered into a line structure which is the low-level primitive.

1.2.2.1 Rejection of short lines

Studies have shown that sides of the signal/shadow boundary generally have at least some portion of their length for which the edge-detector furnishes an unbroken chain of edge-pixels. In order to avoid false positives therefore, an implicit rule is that a side cannot be composed entirely of very short edge-chains, but must have at least one line (in the line-group) which is of substantial length. Prior to segmentation and extraction of the line primitives therefore, chains of edge-pixels shorter than some threshold length are rejected (from $\{S(i,j)\}$) at this point. By this means, the number of low-level primitives is reduced without compromising the accuracy: short lines may form part of the final prospective signal-shadow boundary following data-retrieval.

1.2.3 Weighted linear regression

A weighted linear regression is performed on each of the lines, by which means the optimal parameters (normal radius to origin, and orientation), and conformity are recorded. The weights are the Sobel-squared magnitudes of the contributing edge-pixels, as a fraction of the maximum Sobel-squared magnitude:

$$w_k(i,j) = G(i,j) / \underset{\forall u,v}{\text{Max}} \{G(u,v)\} \; \forall i,j$$

1.2.3.1 Rejection of poor lines

Lines are no longer 'local' entities. The test on conformity to a straight line is now repeated with a less tolerant threshold in accordance with the extra precision afforded by the (arbitrarily large) number of edge-pixels in the line:

1.2.4 Linear extrapolation

Figure 6:
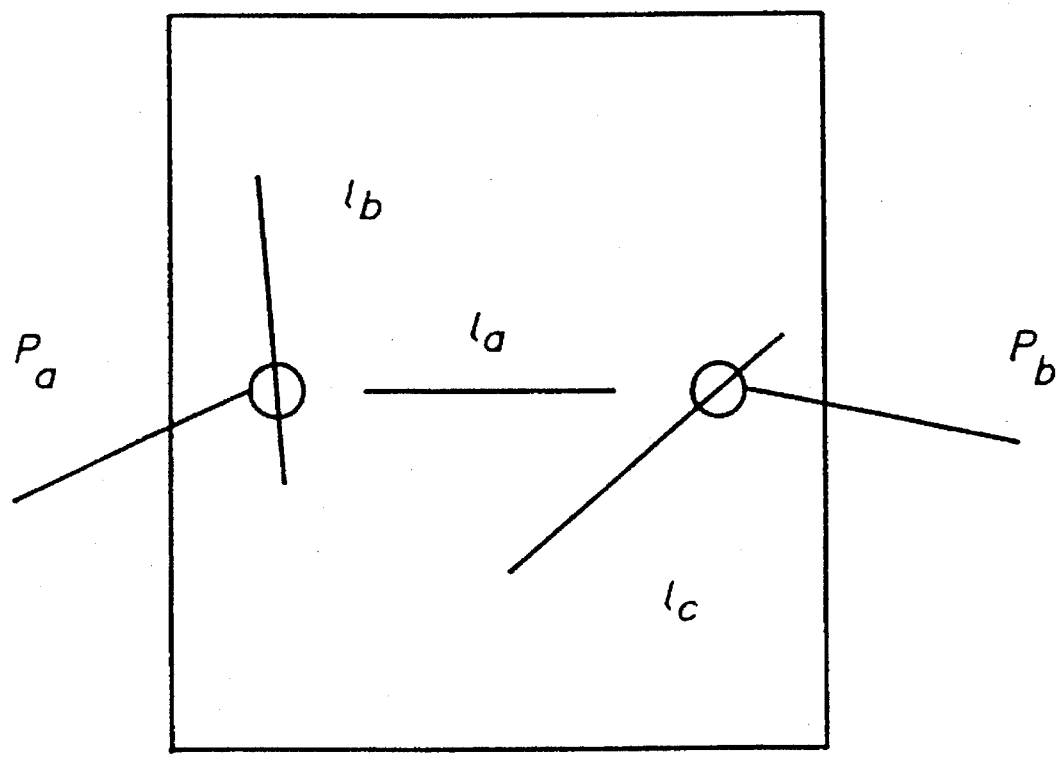
FIG. 6 is an example of linear extrapolation. Points $P_a$ and $P_b$ are the limits of line $1_a$.

The surviving lines are extrapolated from each end, until they intersect either the edge of the image, or an edge-point which does not belong to that line (as determined from the labels in $\{S(i,j)\}$). The 'limits' so determined, are saved in the line structure. A distinction is made between each of the two limits which correspond to the two ends of the line. This distinction respects the sense of the line: see FIG. 6.

1.2.5 Data-retrieval

Edge-points are now recovered from $\{E(i,j)\}$ which were not classified as EDGE-POINTs in $\{V(i,j)\}$ (perhaps because they were reclassified as CORNERs, CURVEs or JUNCTIONs etc). For each line, two rectangular areas are scanned in $\{E(i,j)\}$ each of which is centred on (aligned with) the projection of the line as given by the regressed parameters $R_{WLR}$ and $Q_{WLR}$. The rectangles extend from the line end-points, to the limits as determined by extrapolation. The width of the rectangle is 5 pixels. All edge-points in $\{E(i,j)\}$ which were not already attributed to the line are now included.

Step ii) Extraction of intermediate-level primitives

2.1 Linear agglomerative clustering

In this connection the following definition are given:

"Linear agglomerative clustering" generally is an iterative process for grouping together lines which are deemed (by some criteria) to be sufficiently similar. E.g. a pair-wise agglomerative clustering process based on an analysis of variance test, and broadly as described in "Unsupervised Estimation of Polynomial Approximations To Smooth Surfaces in Images or Range Data" by J. F. Silverman and D. B. Cooper, Proc. IEEE Conf. on Automation and Robotics, 1986, page 299–304. and defined hereinbelow, but with the mergable entities being lines rather than regions, and the constraint that two mergable regions be touching replaced by a constraint that two lines (or line-clusters) be linearly coherent.

"Analysis of variance" is a statistical method for comparing (the similarity of) two sample distributions under the assumption that the underlying distribution is Gaussian; but the variance is unknown. The method determines an F-statistic, which is the ratio of the two sample variances, correctly normalised to take account of the true degrees of freedom.

When the test is to determine the likelihood of two distributions having the same parent distribution, then the ratio is between the unexplained and the explained variances. When applied to pair-wise clustering, the unexplained variance is the extra that is incurred by the proposed merge:

$$<\sigma_u^2> = (\chi_m^2 - \chi_a^2 - \chi_b^2)/|v_m - v_a - v_b|$$

where a,b and m denote the separate, and merged entities respectively; $\chi$ and $v$ are the chi-squared variates and corresponding degrees of freedom. The explained variance is that prior to the proposed merge:

$$<\sigma_e^2>=(\chi_a^2+\chi_b^2)/(v_a+v_b)$$

and $$F(v_u, v_e)=<\sigma_u^2>/<\sigma_e^2>$$

is the F statistic, having degrees of freedom $$v_u=|v_m-v_a-v_b|$$

and $$v_e=v_a+v_b$$

The F statistic is used to index the cumulative distribution function $Q(F|v_a, v_b)$ which gives the probability of that value or greater occuring by chance. If the unexplained variance (as a fraction of the explained) is low, then F is small, and $Q(F|v_a, v_b)$ is large. In that case, the entities may be safely clustered.

Figure 9C:
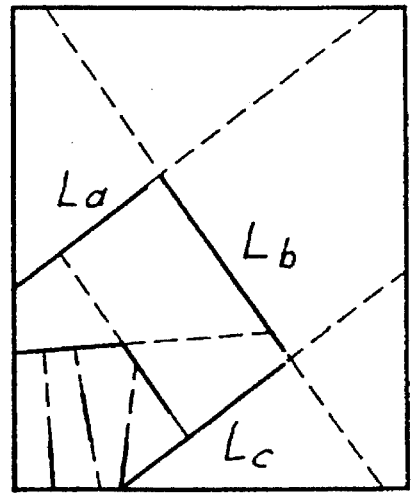
FIG. 9c shows projection of line-clusters.
Figure 10A:
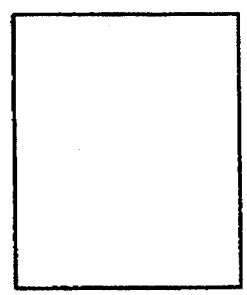
FIG. 10a–h illustrates all legal combinations of line clusters.
Figure 10B:
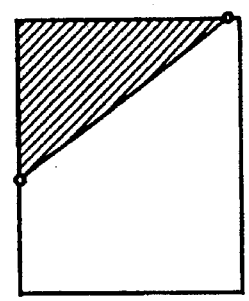
Figure 10C:
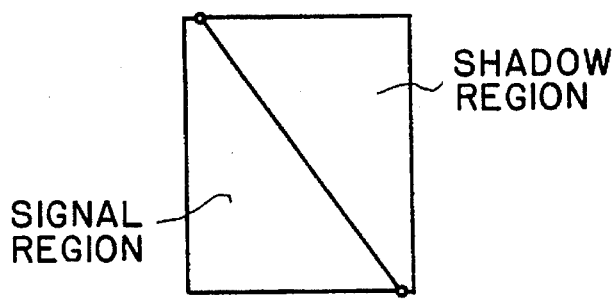
Figure 10D:
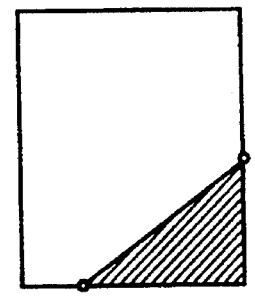
Figure 10E:
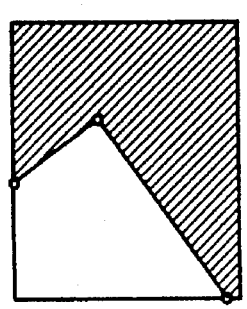
Figure 10F:
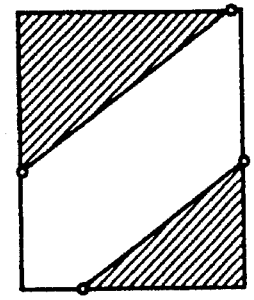
Figure 10G:
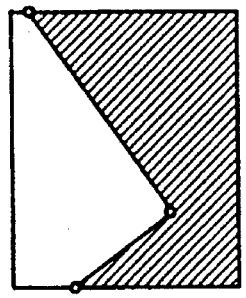
Figure 10H:
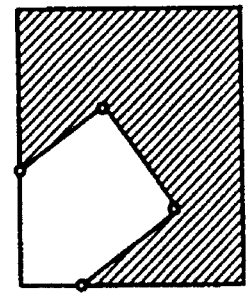

In the described embodiment of the present invention lines undergo linear agglomerative clustering according to a test of their linear coherency. For all line or line-cluster pairs, if the pair passes the test of linear coherency, an F statistic based on an analysis of variance, is computed. The pair with the highest probability $Q(F|v_a, v_b)$ is merged. The parameters and limits of the merged line-cluster are recomputed using weighted linear regression. The whole cycle is repeated until no line-clusters pass the linear coherency test. An example of a set of line-clusters, following linear agglomerative clustering, is given in FIG. 9c.

2.1.1 Linear Coherency
Definitions:
Linearly coherent: Two lines or line-clusters are said to be linearly coherent if they could potentially form part of the same side of the rectangular signal/shadow boundary. Linear agglomerative clustering: an iterative process for grouping together lines which are deemed (by some criteria) to be sufficiently similar. E.g. a pair-wise agglomerative clustering process based on an analysis of variance test, and broadly as described in (Silverman & Cooper), but with the mergable entities being lines rather than regions, and the constraint that two mergable regions be touching replaced by a constraint that two lines (or line-clusters) be linearly coherent.

In the described embodiment of the present invention the linear coherency test is applied to each line or line-cluster pair during linear agglomerative clustering. For two line or line-clusters to be viable candidates for clustering:

1. They must be approximately colinear.
2. Their extrapolations must overlap or touch.

2.1.1.1 Colinearity
Two line-clusters are determined as colinear if:

1. The line-clusters are approximately parallel:

$$\text{Min}\{Q^{(1)}_{WLR}-Q^{(2)}_{WLR}-2e\pi\}<15° \text{ e in } \{-1,0,1\}$$

and

Figure 7A:
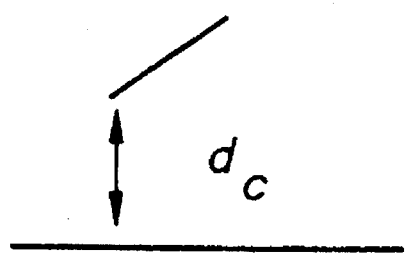
FIGS. 7a–c are examples of closest approach of two lines.
Figure 7B:
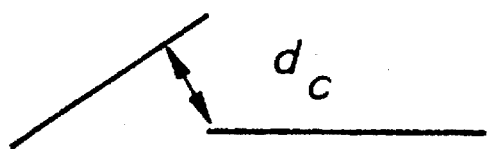
Figure 7C:
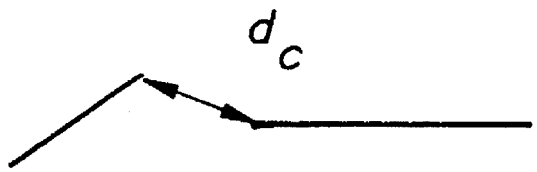

2. The distance of closest approach between the two line-clusters is less than some threshold: $d_c<4$ pixels where the $d_c$ are the distances depicted in FIG. 7.

Figure 8A:
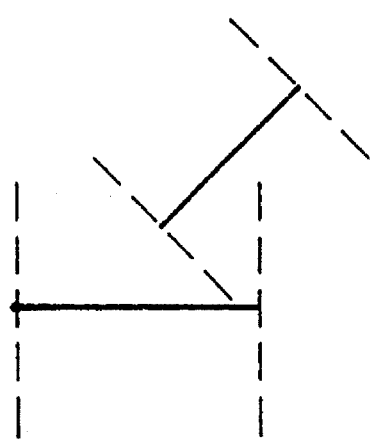
FIGS. 8a–b are an example showing overlapping, and non-overlapping lines.
Figure 8B:
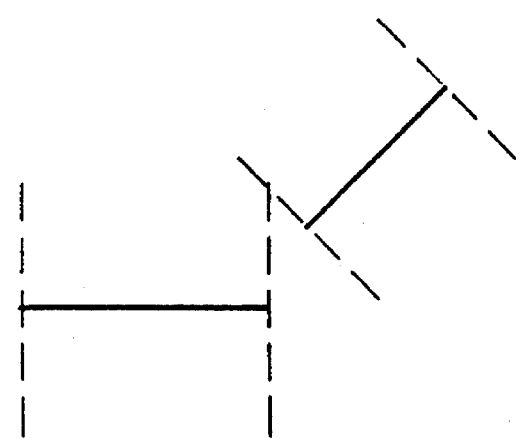

2.1.1.2 Overlapping lines
Two line-clusters are said to have overlapping extrapolations if either has a perpendicular projection onto the other: see FIG. 8.

2.1.2 Analysis Of Variance
The F-statistic based upon the analysis of variance is applied to test the likelihood that two sample distributions come from the same parent distribution. With reference to the definition of analysis of variance, and weighted linear regression, the chi-squared variates are the sum of square errors of the best fit straight line:

$$\chi_j^2=\lambda\_{(j)}$$

where the line-cluster index j is any of a,b,m. The corresponding degrees of freedom are:

$$v_a=N_a-2$$

$$v_b=N_b-2$$

$$v_m=N_a+N_b-2$$

where $N_a$ and $N_b$ are the numbers of edge-pixels in the lines (of labels a and b respectively).

Step iii) Building hypotheses
3.1. Search Tree
A search tree is constructed of all legal combinations of line-clusters: see FIG. 10a–h. The tree starts with a root node which corresponds to the null prospective signal-shadow boundary that there is no collimation material present, and therefore that the signal/shadow boundary is absent. The addition of a new branch & node to the tree represents the addition of a further line-cluster to the prospective signal-shadow boundary inherited from the parent node: each new node is associated with a new line-cluster. Therefore the return path from a particular node to the root determines the line-clusters in the prospective signal-shadow boundary associated with that node.

The search tree has at most five levels, corresponding to the null hypothesis, and four levels for each of the four sides of the rectangular signal/shadow boundary. Each node represents a prospective signal-shadow boundary in its own right.

Figure 11:
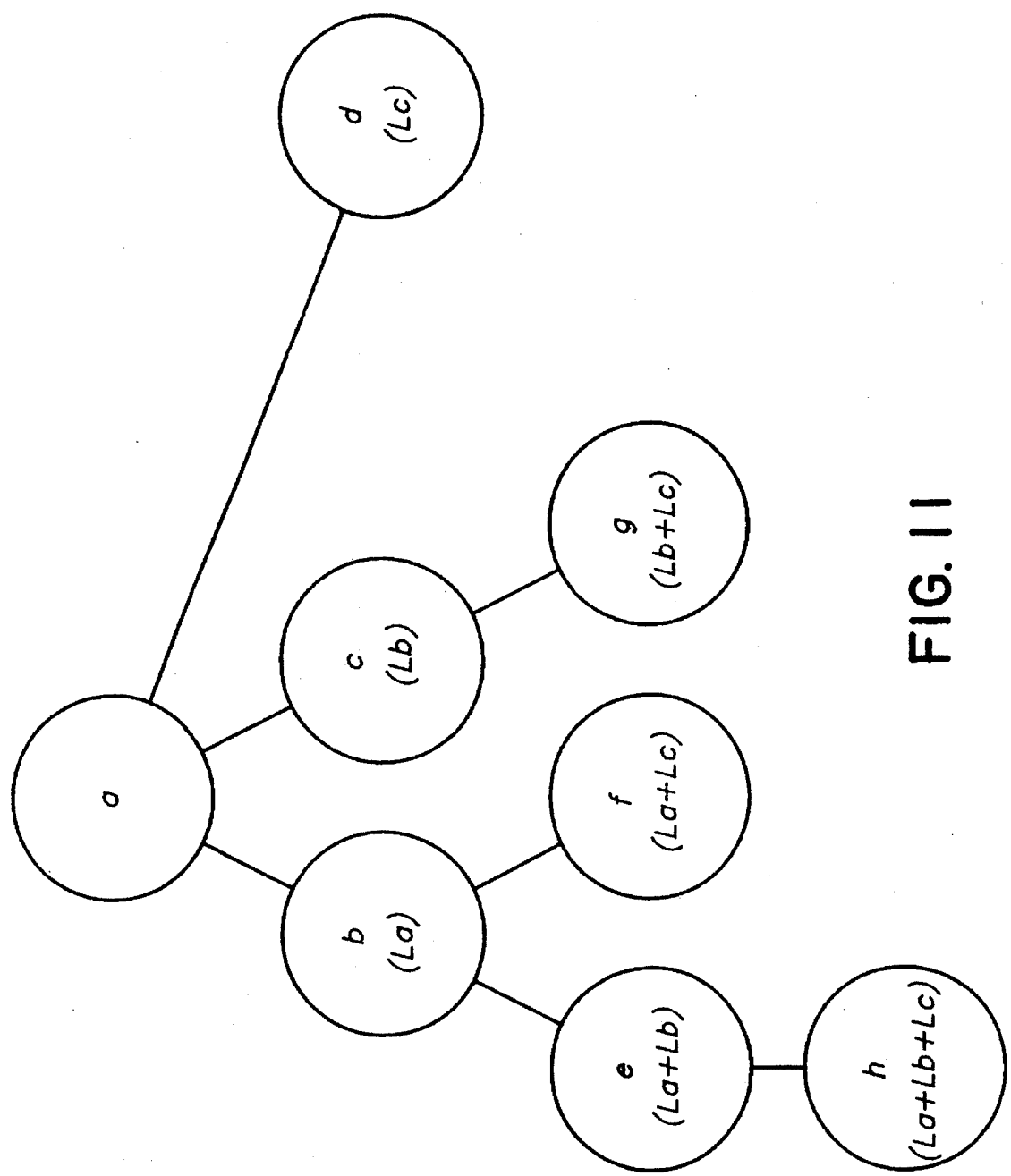
FIG. 11 is a possible search tree for example of FIGS. 9 and 10, the letters denote the labelling in FIG. 10.

As each node is added, the intermediate-level tests are applied to test the legality of the hypothesis. If the results are negative, then the node is flagged as illegal, excluded from further consideration, and the creation of offspring prohibited. Assuming all the hypotheses shown are legal, the example of FIG. 10 would result in a search tree in its final state as given in FIG. 11.

3.2. Intermediate-level tests
The following must be satisfied by each prospective signal-shadow boundary during the construction of the search tree:

3.2.1. Orthogonality
All sides in a prospective signal-shadow boundary must be approximately mutually orthogonal. Following addition of a new line-cluster at node n, this test is applied as:

$$\text{Min}\{|(Q^{(n)}_{WLR}-Q^{(p)}_{WLR}-k\pi/2|\}<0.13k \text{ in } \{-4..-1,1...4\}$$

where the Q are in radians, and where p ranges over all nodes but n in the return path. If the new node fails this test, it is declared illegal.

3.2.2. Closure
All sides in a prospective signal-shadow boundary must meet, at each end, either another side, or the edge of the image. Following the addition of a new line-cluster at node n, this test is applied by examining the limits of the new line-cluster at node n, and other line-clusters (at nodes p) in the return path which form an adjacent side of the rectangle.

Step iv) Testing and costing hypotheses
Once the prospective signal-shadow boundary has been built, the intersection points for each of the sides of the candidate signal/shadow boundary are computed. These intersections may be either with the edge of the image, or with another side; see FIG. 9. The high level rules must then be satisfied in order that the prospective signal-shadow boundary is verified.

4.1. Definition of terms and symbols

Image dimensions—Let the number of pixels in the image array be Imagewidth and Imageheight in the x and y directions respectively.

Number of sides—Let the number of (visible) sides in the hypothesis be N ($0 \leq N \leq 4$).

Intersection points—Let the intersection points of the kth side be ($\alpha_k, \beta_k$) and ($\gamma_k, \delta_k$) for the intersections nearest the lower, and upper limits, $l_k$ and $u_k$ respectively.

Interval—Let the interval of the kth side be $$\Delta_k = \text{Max}\{|\alpha_k - \gamma_k|, |\delta_k - \beta_k|\} + 1.$$

RECTANGLE NOT SMALL—Let the signal/shadow boundary not be small if $\Delta_k >= 10$ for k in $\{1..N\}$ Accumulated evidence—Let the accumulated evidence for the kth side be $W_k = \Sigma_j w_{k,j}$ where the sum is over all edge-points contributing to the kth side. Let the accumulated evidence for the kth interval be $W'_k = \Sigma_j w_{k,j}$ where the sum is over all edge-points contributing in the interval of the kth side.

EVIDENCE WELL USED—Let the amount of 'unused' evidence be small if: $W'_k/W_k > 0.4$ for all k in $\{1..N\}$ Exposure statistics—Let $\max_k$ and $\text{mean}_k$ be the maximum and mean exposures (in the X-ray image) in the half-plane exterior to the kth side of the rectangle. Let $\max_{in}$ and $\text{mean}_{in}$ be the maximum and mean exposures in the interior (signal) part of the rectangle.

STRONG CONTRAST BOUNDARY—Let the boundary have strong contrast if: $(\max_k - \text{Min}\{X(i,j)\}/\max_{in} - \text{Min}\{X(i,j)\}) < 0.65$ and $\text{mean}_k/\text{mean}_{in} < 1.05$ for all k in $\{1..N\}$ VERY STRONG CONTRAST BOUNDARY—Let the boundary have very strong contrast if:

$(\max_k - \text{Min}\{X(i,j)\})/(\max_{in} - \text{Min}\{X(i,j)\}) < 0.3$ and $\text{mean}_k/\text{mean}_{in} < 1.05$ for all k in $\{1..N\}$ Line support—let $\text{pix}_k$ be the number of pixels in the interval of the kth side, for which some evidence exists, ie for which $w_k \neq 0$.

PERSISTENT BOUNDARY—Let the boundary be persistent if: $(\text{pix}_k + 2)/\Delta_k > 0.8$ for all k in $\{1..N\}$ VERY PERSISTENT BOUNDARY—Let the boundary be very persistent if: $(\text{pix}_k + 2)/\Delta_k > 0.88$ for all k in $\{1..N\}$ BOUNDARY HAS TWO ALIGNED SYMMETRIC SIDES—Let the boundary have two aligned symmetric sides if:

N=2 and $$\left\{ \underset{n \text{ in } \{-1,0,1\}}{\text{Min}} \{|Q_{WLR}^{(K)} - K\pi/2 - 2n\pi|\} \leq 0.087 \right\} \quad K \text{ in } \{1,3\}$$

and $|R_{WLR}^{(3)} - R_{WLR}^{(1)}|/\text{Imagewidth} < 0.1$ or

N = 2 and $$\left\{ \underset{n \text{ in } \{-1,0,1\}}{\text{Min}} \{|Q_{WLR}^{(K)} - K\pi/2 - 2n\pi|\} \leq 0.087 \right\} \quad K \text{ in } \{2,4\}$$

and $|R_{WLR}^{(4)} - R_{WLR}^{(2)}|/\text{Imagewidth} < 0.2$ where the labels K=1,2,3,4 correspond to those lines having angles with respect to the x axis, closest to $\pi/2$, $\pi$, $3\pi/2$, and $2\pi$ radians.

BOUNDARY HAS STRONG GESTALT—The boundary has strong gestalt if:

N=4 or BOUNDARY HAS TWO ALIGNED SYMMETRIC SIDES

BOUNDARY HAS FOUR ALIGNED AND ROUGHLY SYMMETRIC SIDES—True if:

N = 4 and $$\left\{ \underset{n \text{ in } \{-1,0,1\}}{\text{Min}} \{|Q_{WLR}^{(K)} - K\pi/2 - 2n\pi|\} \leq 0.087 \right\} \quad K \text{ in } \{1,4\}$$

and $|R_{WLR}^{(4)} - R_{WLR}^{(2)}|/\text{Imagewidth} < 0.2$ and $|R_{WLR}^{(3)} - R_{WLR}^{(1)}|/\text{Imagewidth} < 0.21$ BOUNDARY HAS TWO LONG ASPECT SYMMETRIC SIDES—True if:

N=2 and Imageheight $\geq$ Imagewidth and $$\left\{ \underset{n \text{ in } \{-1,0,1\}}{\text{Min}} \{|Q^{(K)} - K\pi/2 - 2n\pi|\} \leq 0.087 \right\} \quad K \text{ in } \{1,3\}$$

and $|R_{WLR}^{(3)} - R_{WLR}^{(1)}|/\text{Imagewidth} < 0.1$ or

N = 2 and Imagewidth < Imageheight and $$\left\{ \underset{n \text{ in } \{-1,0,1\}}{\text{Min}} \{|Q^{(K)} - K\pi/2 - 2n\pi|\} \leq 0.087 \right\} \quad K \text{ in } \{2,4\}$$

and $|R_{WLR}^{(4)} - R_{WLR}^{(2)}|/\text{Imagewidth} < 0.1$

BOUNDARY HAS VERY STRONG GESTALT—True if:

BOUNDARY HAS FOUR ALIGNED AND ROUGHLY SYMMETRIC SIDES or BOUNDARY HAS TWO LONG ASPECT SYMMETRIC SIDES 4.2. Verification rules A prospective signal-shadow boundary is accepted if the following composite rule is satisfied:

RECTANGLE NOT SMALL and EVIDENCE WELL USED and (BOUNDARY HAS VERY STRONG CONTRAST and BOUNDARY IS PERSISTENT or BOUNDARY HAS STRONG CONTRAST and BOUNDARY IS VERY PERSISTENT or BOUNDARY HAS VERY STRONG GESTALT and BOUNDARY IS PERSISTENT or BOUNDARY HAS VERY STRONG GESTALT and BOUNDARY HAS STRONG CONTRAST or BOUNDARY HAS STRONG GESTALT and BOUNDARY IS VERY PERSISTENT)

4.3. Costing hypotheses

If a prospective signal-shadow boundary is rejected, it is awarded (effectively) an infinitely large cost. If the prospective signal-shadow boundary is accepted however, it is awarded a cost which is determined as described below:

Let $P_{out}=0.1$ be the fraction of pixels on the collimation/signal boundary which do not have a corresponding edge-pixel as determined by the Canny edge-detector.

Let $P_{in}=0.1$ be the fraction of pixels which are co-linear with, but not on, a side of the collimation/signal boundary, yet which are labelled as edge-pixels by the Canny edge-detector.

Then the probability $P_{in}$ of having k or more edge-pixels missing on a collimation/signal boundary of total interval (between intersects) n pixels is :

$$P_{in} = \sum_{s=k}^{n} \binom{n}{s} p^s q^{n-s} = Q(F| v_1, v_2)$$

where $q=1-p_{in}$; $v_1=2(n-k+1)$; $v_2=2k$; $F=k(1-p_{in})/(n-k+1)$.

The same formula applies to the probability $P_{out}$ of there being k or more edge-pixels which are colinear with, but not on, sides of the collimation/signal boundary, of total interval between intersects n, and total interval between limits of L, provided:

$$q=1-p_{out}; v_1=2(L-n-k+1); v_2=2k; F=k(1-p_{out})/(L-n-k+1).$$

The cost awarded is then:

$$4-N+\text{Min}\{0.999, -\log(P_{in}P_{out})/100\}.$$

This function constrains the contribution from missing, and extra, edge-pixels to lie in [0, 0.999]. The main part of the cost is determined by the number of sides: 0 for 4 sides, 1 for 3 sides, etc. The implicit rules area that:

1. Validated hypotheses are unconditionally cheaper for having more sides.
2. Given two prospective signal-shadow boundary of equal number of sides, the cheapest is that which best explains the data.

Step v) Choosing the best prospective signal-shadow boundary

The solution search tree is maintained by a branch and bound function. All possible hypotheses (potentially legal combinations of line-clusters) are considered. The prospective signal-shadow boundary system is that with the lowest cost, as awarded at step iv). If no other hypothesis is validated, the null prospective signal-shadow boundary that there is not signal/shadow boundary (and therefore no shadow region) is always valid (with a cost of 4 units).

FIG. 12 shows an embodiment of an exposure and read-out apparatus. A radiation image of an object was recorded on a photostimulable phosphor screen (6) by exposing (3) said screen to X-rays transmitted through the object. The irradiation field emitted by the X-ray source was limited by using a opaque X-ray shield (4). The radiation image stored in the photostimulable phosphor screen was read-out by scanning the phosphor screen with stimulating rays emitted by a laser (9). The stimulating rays were deflected according to the main scanning direction by means of galvanometric deflection device (8). The secondary scanning motion was performed by transporting the phosphor screen in a direction indicated by arrow (7) perpendicular to the main scanning direction. The stimulated emission was directed by means of light collector (10) onto a photomultiplier (11) where it was converted into an electric signal representation. The analog output signal is then digitised (not shown).

This signal can then be subjected to a processing method according to the present invention for the purpose of determining the location of the signal-shadow boundary and hence also to the determination of the useful image region. Contrast enhancing processing can then be limited to the diagnostically useful image part.

We claim:

1. A method for determining the signal/shadow boundary in an X-ray image represented by a digital signal representation comprising the steps of:

i) extracting lines from said x-ray image, ii) applying linear agglomerative clustering to said lines so as to form a number of line groups, iii) forming a number of chains of at least two of said line groups by appending to a single line group an additional line group, said process of appending being restricted by the outcome of intermediat level tests performed on said single line group and said additional line group, iv) forming prospective signal/shadow boundaries, each prospective signal/shadow boundary comprising a single line group or a chain, v) performing high level verification tests on each prospective signal/shadow boundary and associating a cost with each signal/shadow boundary, the cost being highest if a prospective signal/shadow boundary comprises a single line group, and decreasing monotonically as a prospective signal/shadow boundary comprises more line groups, vi) rejecting or accepting a prospective signal/shadow boundary at some cost, vii) if at least one accepted prospective signal/shadow boundary exists, selecting a prospective signal/shadow boundary with the least cost as the signal/shadow boundary; otherwise concluding that no signal/shadow boundary exists.

2. A method according to claim 1 wherein in the linear agglomerative clustering process any two lines or two line groups, or a line and a line group are merged into a single line group if:

their difference of orientation is less than some predetermined value, their distance of closest approach is less than some predetermined value, they have overlapping extrapolations the outcome of the F-statistic based upon an analysis of the variance of pixel distributions of lines or line groups to be merged and of a prospective signal/shadow boundary under consideration is such that said lines or line groups most likely belong to a linear pixel distribution.

3. A method according to claim 1, wherein said high-level verification tests for the acceptability of a signal/shadow boundary, comprise a logical combination of the following tests for:

boundary closure, for which test to be passed, for a prospective signal/shadow boundary under consideration, line groups are linear extrapolated at their extremities so as to form extrapolated line groups and extrapolated line-groups must each terminate on, or intersect with, another line-group in the same prospective boundary, or with the edge of the image, boundary shape, for which test to be passed, for the prospective signal/shadow boundary under consideration, is to be rectangular, or nearly rectangular, or in the case of there being less than four sides in a prospective signal/shadow boundary, the visible sides of said boundary are consistent with a partially visible rectangular or nearly rectangular shape, signal/shadow contrast, for which test to be passed, for the prospective signal/shadow boundary under consideration, is to be largely consistent with there being a lower level of exposure in the shadow region than the level of exposure in the signal region, boundary location, for which test to be passed, for a prospective signal/shadow boundary under consideration, the centre of the image must be either contained within the signal region, or must be close to a signal/shadow boundary, boundary alignment, for which test to be passed, for a prospective signal/shadow boundary under consideration, each visible side of the rectangle must be parallel to a side of the image, boundary symmetry, for which test to be passed, for a prospective signal/shadow boundary under consideration, there must be two or four visible sides of a rectangular, which are parallel to a side of the image and approximately equidistant from the edge of the image, boundary completion, for which test to be passed, for a prospective signal/shadow boundary under consideration, the fraction of the number of pixels in an edge image relative to the maximum possible number of pixels along the signal-shadow boundary exceeds a predetermined threshold.

4. A method according to claim 1 wherein said prospective signal/shadow boundaries comprise at least four line groups.

5. A method according to claim 1 wherein said cost of each prospective signal/shadow boundary is further refined by decreasing the cost according to the fraction of the prospective signal/shadow boundary of which the edge strength of underlying pixels is greater than a first predetermined threshold, is below a second predetermined threshold.

6. A method of processing a digital image representation of an x-ray image comprising the steps of:

(i) determining a signal/shadow boundary within said image by:

a) extracting lines from said x-ray image, b) applying linear agglomerative clustering to said lines so as to form a number of line groups, c) forming a number of chains of at least two of said line groups by appending to a single line group an additional line group, said process of appending being restricted by the outcome of intermediate level tests performed on said single line group and said additional line group, d) forming prospective signal/shadow boundaries, each prospective signal/shadow boundary comprising a single line group or a chain, e) performing high level verification tests on each prospective signal/shadow boundary and associating a cost with each signal/shadow boundary, the cost being highest if a prospective signal/shadow boundary comprises a single line group, and decreasing monotonically as a prospective signal/shadow boundary comprises more line groups, f) rejecting or accepting a prospective signal/shadow boundary at some cost, g) if at least one accepted prospective signal/shadow boundary exists, selecting a prospective signal/shadow boundary with the least cost as the signal/shadow boundary; otherwise concluding that no signal/shadow boundary exists, and (ii) restricting image processing to pixels within said signal/shadow boundary.

7. A method of determining a signal/shadow boundary according to any of the preceding claims wherein said digital image representation of an x-ray image is obtained by scanning a photostimulable phosphor screen that has been exposed to an x-ray image with stimulating irradiation, detecting light emitted upon stimulation and converting the detected light into a digital signal representation.

* * * * *